United States Patent
Miyamoto et al.

(10) Patent No.: US 7,207,397 B2
(45) Date of Patent: Apr. 24, 2007

(54) MULTI-POLE TRANSMITTER SOURCE

(75) Inventors: Kenichiro Miyamoto, Sagamihara (JP); Atsushi Saito, Sagamihara (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 138 days.

(21) Appl. No.: 10/675,053

(22) Filed: Sep. 30, 2003

(65) Prior Publication Data

US 2005/0067191 A1   Mar. 31, 2005

(51) Int. Cl.
*E21B 47/00* (2006.01)
(52) U.S. Cl. ......................... 175/50; 175/40; 166/254.1
(58) Field of Classification Search ................ 166/249, 166/250.01, 177.1, 177.2, 177.6, 177.7; 175/40, 175/320; 73/152.03, 152.16, 152.19, 152.47, 73/152.58
See application file for complete search history.

(56) References Cited

U.S. PATENT DOCUMENTS

| | | | | |
|---|---|---|---|---|
| 3,608,373 A | * | 9/1971 | Youmans | 73/152.15 |
| 3,863,203 A | * | 1/1975 | Patton et al. | 367/85 |
| 4,184,562 A | | 1/1980 | Bakamjian | |
| 4,255,798 A | * | 3/1981 | Havira | 367/35 |
| 4,302,826 A | * | 11/1981 | Kent et al. | 367/82 |
| 4,415,998 A | | 11/1983 | Blizard | |
| 4,525,645 A | * | 6/1985 | Shirley et al. | 310/337 |
| 4,541,081 A | * | 9/1985 | Smith | 367/168 |
| 4,685,091 A | | 8/1987 | Chung et al. | |
| 4,774,693 A | | 9/1988 | Winbow et al. | |
| 4,949,316 A | | 8/1990 | Katahara | |
| 4,951,267 A | * | 8/1990 | Chang et al. | 367/31 |
| 5,130,950 A | * | 7/1992 | Orban et al. | 367/34 |
| 5,343,001 A | | 8/1994 | Cowles et al. | |
| 5,615,172 A | * | 3/1997 | Kotlyar | 367/83 |
| 5,753,812 A | * | 5/1998 | Aron et al. | 73/152.47 |
| 5,798,488 A | * | 8/1998 | Beresford et al. | 181/102 |
| 5,924,499 A | * | 7/1999 | Birchak et al. | 175/40 |
| 6,193,010 B1 | | 2/2001 | Minto | |
| 6,272,916 B1 | * | 8/2001 | Taniguchi et al. | 73/152.47 |
| 6,354,146 B1 | * | 3/2002 | Birchak et al. | 73/61.79 |
| 6,817,229 B2 | * | 11/2004 | Han et al. | 73/64.53 |
| 6,912,177 B2 | * | 6/2005 | Smith | 367/82 |
| 6,957,572 B1 | * | 10/2005 | Wu | 73/152.16 |
| 2002/0070017 A1 | * | 6/2002 | Soliman et al. | 166/249 |
| 2003/0015319 A1 | * | 1/2003 | Green et al. | 166/250.01 |
| 2003/0150262 A1 | * | 8/2003 | Han et al. | 73/152.18 |
| 2004/0200613 A1 | * | 10/2004 | Fripp et al. | 166/250.01 |
| 2005/0000279 A1 | * | 1/2005 | Yogeswaren | 73/152.58 |
| 2005/0034530 A1 | * | 2/2005 | Han et al. | 73/784 |
| 2005/0150655 A1 | * | 7/2005 | Duong et al. | 166/249 |
| 2005/0161258 A1 | * | 7/2005 | Lockerd et al. | 175/45 |
| 2005/0167101 A1 | * | 8/2005 | Sugiyama | 166/249 |

FOREIGN PATENT DOCUMENTS

GB    2306190    6/1997

* cited by examiner

*Primary Examiner*—Frank S. Tsay
(74) *Attorney, Agent, or Firm*—Karan Singh; William Batzer; Dale Gaudier

(57) ABSTRACT

Methods and apparatus facilitating logging-while-drilling (LWD) using a multi-pole acoustic transmitter source. The multi-pole transmitter source enables measurement of formation velocities, including shear wave velocities through formations that are slower than velocities through local fluids. The methods and apparatus may be utilized for LWD and wireline seismic surveys in which both the seismic or acoustic source and receivers are both deployed in a borehole, but may also be used for VSPs (vertical seismic profiling).

47 Claims, 3 Drawing Sheets

MULTI-POLE TRANSMITTER SOURCE

FIELD OF THE INVENTION

The present invention relates generally to sonic or acoustic logging of formations surrounding a borehole. More particularly, the present invention relates to a multi-pole transmitter source for use with a logging-while-drilling (LWD) system.

BACKGROUND OF THE INVENTION

The generation and recording of acoustic waves through a subterranean formation is a key measurement employed in wellbore logging. Acoustic waves propagate underground at velocities that vary from different geological formations. For example, an acoustic waves travel at about 4000 meters per second through sandstone, and about 5000 meters per second through limestone. Sound waves are generally classified into two types: longitudinal and transverse. A longitudinal or compressional wave is one in which the medium oscillates in the same direction the wave propagates. A transverse or shear wave is one in which the medium oscillates perpendicular to the direction the wave propagates. The speed or velocity of an acoustic wave through a medium is related to the porosity of the medium, an important characteristic of a formation insofar as its potential for containing hydrocarbons is concerned.

Many different logging tools are currently available for taking acoustic measurements to calculate acoustic wave velocity (and its reciprocal, slowness). A typical logging tool includes two receivers spaced along an axis of the tool at known distances from an acoustic transmitter. In the case of a single-transmitter, two-receiver tool suggested by the prior art, acoustic velocity is estimated by subtracting wave arrival times between the two receivers and dividing by the inter-receiver spacing. This estimate, however, is subject to inaccuracies due to tool tilt, borehole washouts, bed boundary effects, etc. Additional acoustic sources and receivers and more robust methods such as STC (Slowness-Time-Coherency analysis) among others have been used to reduce the inaccuracies introduced by such environmental effects. However, the more porous a formation is, the slower the wave propagation velocity is.

The foregoing logging techniques and others are often used in open and cased-hole wellbores, with an acoustic tool suspended on electric wireline. However, in recent years various tools and equipment have become available that enable logging-while-drilling. LWD systems are sometimes incorporated into special drill collars located near the bit. The results of logging measurements may be telemetered uphole, usually in the form of pressure pulses in the mud stream for detection, display and/or recording, substantially in real time or may be recorded for later retrieval. Usually the acoustic tool is equipped with a monopole transmitter for use in measuring compressional and shear wave velocity. However, shear wave velocity of a formation cannot be measured using a monopole transmitter when the shear wave velocity is slower than the velocity of the fluid (typically drilling mud) in the wellbore. This is because refraction cannot occur between the fluid and the formation if the velocity through the fluid is greater than the velocity through the formation (i.e. $V_f > V_s$).

In addition, LWD environments impose several harsh conditions and restrictions that an acoustic source transmitter must survive. The conditions and restrictions include, among other things, very limited space for a transmitter in the drill string, a need for high output pressure signals because of the noise generated by the drill, a highly erosive, high temperature and high pressure environment, and a limited power supply. There is a need for an LWD system capable of providing formation velocity under harsh conditions and restrictions, even when the formation velocity is slower than fluid velocity in the wellbore.

SUMMARY OF THE INVENTION

The present invention addresses the above-described deficiencies and others. Specifically, the present invention provides an apparatus for generating acoustic waves in a formation traversed by a wellbore including a multi-pole transmitter, the multi-pole transmitter comprising four monopole acoustic transmitter elements housed in a drill collar, the four monopole acoustic transmitter elements being spaced around a circumference of the drill collar at approximately equal intervals. The four multi-pole acoustic transmitter elements may be operated to create a monopole, dipole, or quadrupole pressure field. According to some embodiments, each of the four monopole transmitter elements includes a cylindrical transducer and a canister surrounding the transducer, with the canister and the cylindrical transducer filled with a fluid. The canister may be made of RADEL®-R (polyphenylsulfone) and have a thickness of approximately 1 mm. The cylindrical transducer may be a PZT piezo-ceramic transducer, which is used according to some embodiments as a tube resonator as well. A voltage is preferably supplied to the PZT piezo-ceramic transducer at a frequency lower than a resonant frequency of the piezo-ceramic transducer, and at a resonant frequency of the fluid in the piezo-ceramic transducer.

According to some embodiments, the cylindrical transducer is sandwiched by spacers having one or more holes. In addition, the spacers are sandwiched by first and second heads, and one or more rods connect the first and second heads. The canister houses the spacers, the first and second heads, and the rods.

According to some embodiments, the PZT piezo-ceramic cylinder is a single piece and is uniformly polarized in a radial direction by applying a voltage across internal and external surfaces of the cylinder with electrodes. The diameter of the PZT piezo-ceramic transducer expands via a d31 effect when a voltage is supplied. Each monopole acoustic transmitter element may further include a bellows-type pressure compensator to maintain or restore linearity between supplied voltage and output pressure. The four monopole acoustic transmitter elements are housed in respective recesses in the drill collar and covered by a shield, the shield including a hole that allows pressure pulses generated by each monopole acoustic transmitter element to travel therethrough. The recesses have a depth of approximately 2.5 to 5 cm, a width of approximately 2.5 to 5 cm, and a length of approximately 25 to 35 cm. The four monopole transmitter elements may each comprise a PZT piezo ceramic cylinder having a length ranging between approximately 5 and 10 cm and a wall thickness ranging from approximately 3 to 6 mm. The drill collar comprises a pipe and may include an outer diameter of approximately 17.5 cm and an inner diameter of approximately 6.1 cm.

Another aspect of the invention provides an apparatus for generating an acoustic signal in response to an input control signal. The apparatus includes a plurality of cylindrical piezo ceramic elements spaced about a common circumference to form an acoustic transmitter, a plurality of polymer canisters, each of the plurality of polymer canisters associated with and housing one of the plurality of cylindrical piezo ceramic elements, where each of the plurality of cylindrical piezo ceramic elements is uniformly polarized in a radial direction. Each of the plurality of cylindrical piezo ceramic elements has an internal and an external surface, and each of the internal and external surfaces is coated with silver or another conductive layer. The conductive layers therefore comprise electrodes, such that the electrodes uniformly polarize the cylindrical piezo ceramic elements radially. Accordingly, none of the plurality of cylindrical piezo ceramic elements need to be pre-stressed, nor wound under tension with high strength fibers.

According to another embodiment of the invention there is an acoustic transmitter apparatus including a drill collar for coupling to a drill string, the drill collar comprising a recess, a cylindrical piezo ceramic element enclosed by a canister disposed in the recess, a fluid contained by the canister, such that the cylindrical piezo ceramic element also comprises a tube resonator, where a length of the cylindrical piezo ceramic element and the type of fluid are chosen such that a fluid resonance frequency is lower than a resonance frequency of the cylindrical piezo ceramic element.

Another aspect of the invention provides a method of logging a wellbore while drilling including providing an acoustic transmitter and a plurality of receivers on a drill string, the acoustic transmitter arranged to provide a monopole, dipole, or quadrupole source from a plurality of monopole source elements, activating the acoustic transmitter, and receiving and recording waveform data. The method may further include enhancing output pressure from the acoustic transmitter by employing the acoustic transmitter as a resonance tube and applying a signal to the acoustic transmitter at a fluid resonance frequency of the resonance tube. The method may also include using waves generated by a d31 effect from the transducer. According to some methods, providing an acoustic transmitter includes providing a cylindrical piezo ceramic element and polarizing the element uniformly in a radial direction. Polarizing may include coating an inner and an outer surface of the element with a conductor to create two electrodes, and applying a voltage across the two electrodes.

Another aspect of the invention provides a method of making an acoustic transmitter, the method including providing a cylindrical piezo ceramic element, coating an inner and an outer surface of the element with a conductive layer to create electrodes, housing the cylindrical piezo ceramic element in a canister, filling the canister with a fluid, and sizing the cylindrical piezo ceramic element such that a fluid resonance frequency in the cylindrical piezo ceramic element is lower than a resonance frequency of the piezo ceramic element itself. The cylindrical piezo ceramic element is uniformly polarized in a radial direction by the electrodes. The method may further include providing four cylindrical piezo ceramic elements, inserting the four cylindrical piezo ceramic elements in four recesses equally spaced about a circumference of a drilling collar, and enclosing the four cylindrical piezo ceramic elements with four closure plates having windows therein.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention.

Figure 1:
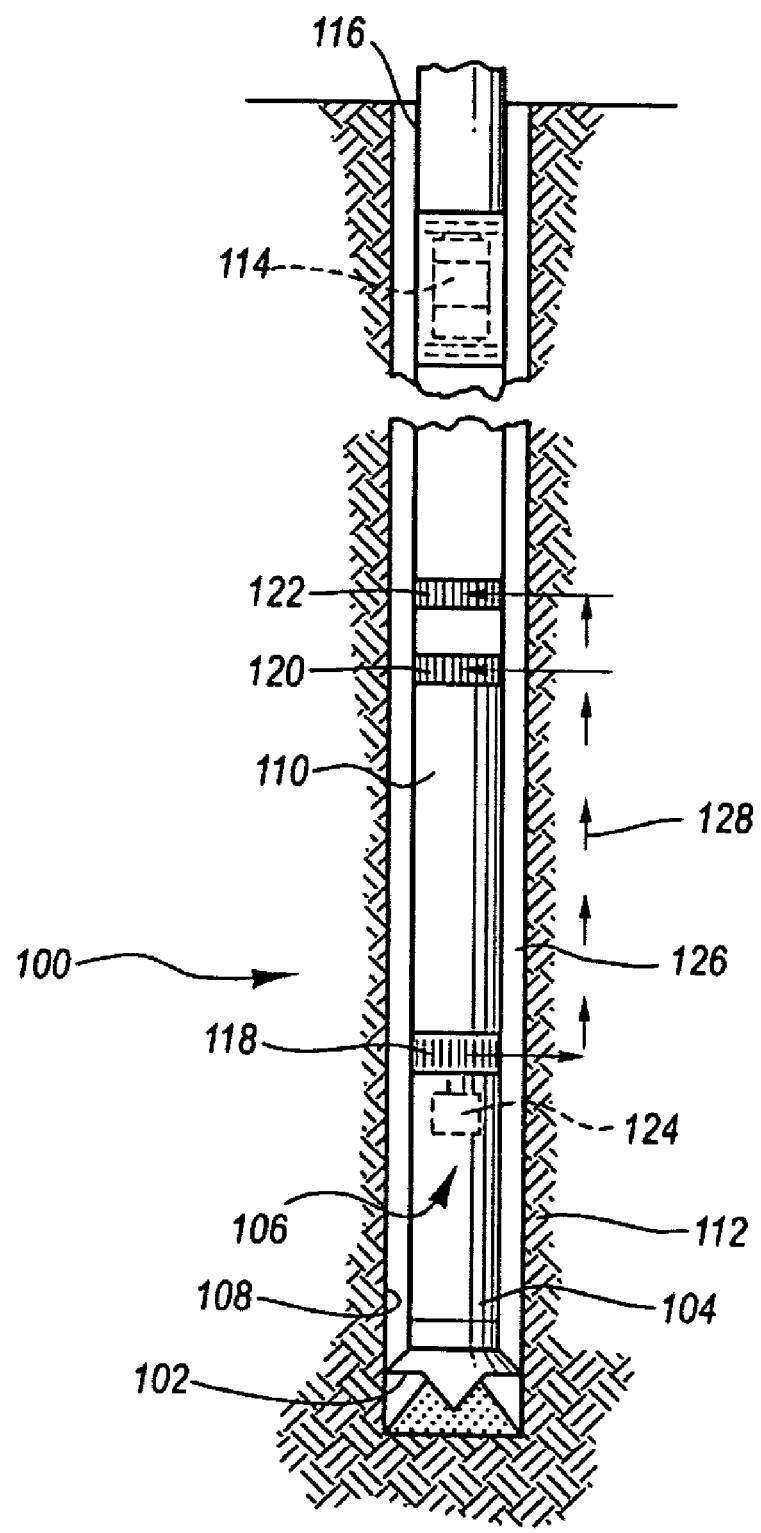
FIG. 1 is a schematic view of a logging-while-drilling operation using acoustic transducers according to one embodiment of the present invention.

Throughout the drawings, identical reference numbers and descriptions indicate similar, but not necessarily identical elements. While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the scope of the invention as defined by the appended claims.

DETAILED DESCRIPTION OF THE PREFERRED EMBODIMENTS

Illustrative embodiments and aspects of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

The present invention contemplates methods and apparatus for logging-while-drilling (LWD). As discussed above, previous LWD systems employ monopole transmitters to generate acoustic waves and measure formation velocity or slowness. However, monopole acoustic sources are not capable of facilitating shear velocity measurements for any portions of a formation that have shear velocities slower than the velocity of the in-well fluid. The principles described herein facilitate a multi-pole acoustic transmitter capable of facilitating measurement of formation shear velocities that are slower than local fluid velocity, while drilling a well. In order to facilitate slow formation shear velocity measurements, dipole, quadrupole, or higher order pressure fields must be generated, with enough strength and coherency to be detected despite the high level of noise generated by a drill. However, while the some of the methods and apparatus described below are particularly well suited and described for LWD seismic surveys in which both the seismic or acoustic source and receivers are deployed in a borehole, the principles described are not so limited, and may also be used for wireline logs, VSP (vertical seismic profiling)—in which either the source or the receiver is at the surface—or other applications.

As used throughout the specification and claims, the terms "borehole" or "downhole" refer to a subterranean environment, particularly in a wellbore. "Drill string" means a combination of drillpipe, a bottomhole assembly, and any other tools used to make a drill bit turn at the bottom of the wellbore. "Drill collar" is used broadly to mean a thick-walled tubular component of a drillstring. "Uniform" or "uniformly" means routinely the same or consonant with another or others. "D33 effect" means the increase of the ceramic thickness in direction of the applied electrical field in peizo stack actuators and stacked piezo rings and "d31 effect" means an in-plane shrinking accompanying the thickness expansion (d33) of a PZT layer.

Turning now to the figures, and in particular to FIG. 1, a drillstring (100) according principles of the present invention is shown. The drillstring (100) includes a drill bit (102) connected to a downhole end (104) of a string of drill collars (106) and drilling a borehole (108) in the earth. A specially designed drill collar (110) near the drill bit (102) houses one or more logging devices used to measure various characteristics of a formation (112) traversed by the borehole (108). Signals that are representative of the measurements are fed to a measuring-while-drilling (MWD) tool (114) which, according to the embodiment of FIG. 1, includes a rotary valve or "siren" than generates pressure pulses in a mud stream inside the drillstring (100). The pressure pulses are transmitted to surface via drillpipe (116). The rotary valve is controlled in response to the measurement signals and produces coded pressure pulses in the mud that are detected at the surface, decoded, and displayed and/or recorded. Mud pulse telemetry systems such as the one shown are readily understood by those of skill in the art having the benefit of this disclosure. Many different measurements related to formation (112) characteristics may be made by the logging devices including, but not limited to: resistivity or conductivity, natural gamma radiation, density, as well as various drilling parameter measurements, such as weight and torque on the drill bit (102) and borehole (108) direction.

While many different measurements can be made, the present invention is directed to an acoustic logging method and apparatus, wherein slowness of a formation is measured by measuring velocity of acoustic waves through the formation (112). Accordingly, the methods apparatus described herein facilitate the measurement of compressional, shear, Stoneley, or other waves. The wave velocity measurements may be transmitted substantially in real-time while drilling. According to the embodiment shown, an acoustic or sonic log is facilitated by a multi-pole acoustic transmitter (118) and a plurality of receivers. As shown in FIG. 1, the plurality of receivers is a set of two receivers (120, 122). The details of the multi-pole acoustic transmitter (118) are shown and described in more detail below with reference to FIGS. 2A–4. The two receivers (120, 122) are spaced at a known axial distance from one another. In general, acoustic waves are generated by the multi-pole acoustic transmitter (118) as electrical control signals are communicated to the transmitter (118) via one or more transmitter drive circuits (124). The waves generated by the multi-pole acoustic transmitter (118) propagate through the mud in an annulus (126) between the drill collar (110) and the borehole (108) and into the formation (112). The propagation direction of some of the acoustic waves is represented by a plurality of arrows (128). The acoustic waves arrive at the two receivers (120, 122) at different times, due to the spacing therebetween. The timing between detection of the acoustic waves by the two receivers (120, 122) is then analyzed to determine wave propagation velocity (and hence formation slowness) on a continuing basis as the borehole (108) continues to be drilled.

Figures 2A, 2B:
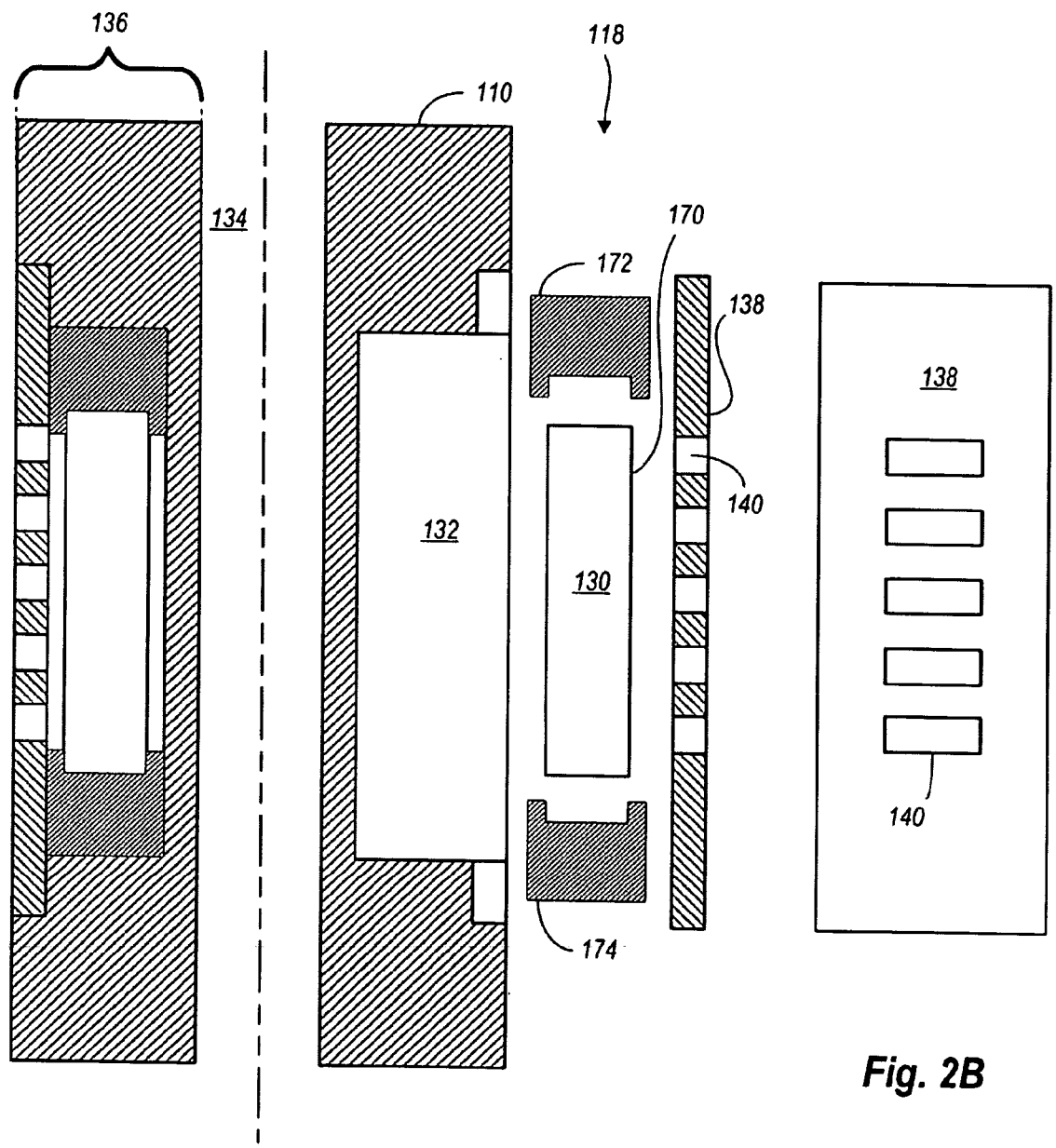
FIG. 2A is a cross-sectional and assembly view of an acoustic transmitter in a drill collar according to one embodiment of the present invention.
FIG. 2B is a front view of a shield or cover plate shown in cross-section in FIG. 2A and housing an acoustic transmitter element according to one embodiment of the present invention.

Referring next to FIG. 2A, a cross-sectional view of the multi-pole acoustic transmitter (118) disposed in the drill collar (110) is shown according to one embodiment of the present invention. The multi-pole acoustic transmitter (118) includes a plurality of monopole acoustic transmitter elements (130). According to the embodiment shown, there are four monopole acoustic transmitter elements (130) spaced around a circumference of the drill collar (110) at approximately equal, ninety-degree angles. One of the monopole acoustic transmitter elements (130) is shown in assembly view for ease of discussion. The monopole acoustic transmitter elements (130) are disposed in associated recesses (132) in the drill collar (110).

The drill collar (110) may be made of stainless steel pipe having an internal passageway (134) for mud passage and a thick wall (136). According to some embodiments an outer diameter of the drill collar (110) ranges between approximately 15.0 and 19.0 cm, preferably about 17.5 cm. An inner diameter of the drill collar (110) may range between approximately 5.0 and 7.0 cm, preferably about 6.1 cm. The four recesses (132) each share substantially the same dimensions. The depth and width of the four recesses (132) may range between approximately 3.0 and 5.0 cm, preferably about 4.06 cm. The length of the four recesses (132) may range between approximately 25.00 and 35.00 cm, preferably about 30.48 cm. Each of the four recesses (132) has an associated shield, which according to FIGS. 2A–B, is a steel plate (138) sized to cover and protect one of the monopole acoustic transmitter elements (130) and lay substantially flush with the outer diameter of the drill collar (110). Each steel plate (138) includes one or more holes (140) so as to allow pressure pulses generated by the monopole acoustic transmitter elements (130) to easily pass therethrough. However, according to an alternative embodiment there is a single shield extending around the drill collar (110) circumferentially to enclose all of the monopole acoustic transmitter elements (130). Each of the monopole acoustic transmitter elements (130) may be wrapped with an insulator such as rubber to prevent damage thereto by cuttings that are ever present in a drilling environment. The arrangement of the four monopole acoustic transmitter elements (130) at substantially equal spacings about the drill collar (110), as well as the combination of the sizes of the recesses (132) and the monopole acoustic transmitter elements (130), maximizes dipole and/or quadrupole output pressure when an appropriate signal or signals from the transmitter drive circuit(s) (124) are present. However, low energy consumption may be a tradeoff with the maximized quadrupole output pressure. The arrangement as shown may thus advantageously provide dipole or quadrupole source waves from monopole elements to effectively determine formation velocities that slower than fluid velocity. Typical monopole sonic logging cannot generate a direct or shear wave into a slow formation ($V_f > V_s$) because refraction cannot occur. However, a dipole or quadrupole acoustic source can advantageously generate a shear wave even in slow formation. A dipole source creates a flexural wave that "kicks" the formation (112), generating a surface wave (called a pseudo-Rayleigh wave) on the borehole (108) wall. A quadrupole source generates what is known as a screw wave. Depending on the signal from the transmitter drive circuit(s) (124), the multi-pole acoustic transmitter (118) may thus operate to create a monopole, dipole, or quadrupole pressure field.

Figure 3:
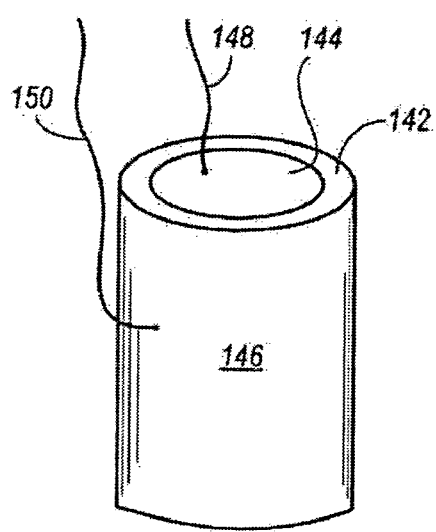
FIG. 3 is a perspective view of a plated piezo ceramic cylinder transducer according to one embodiment of the present invention.
Figure 4:
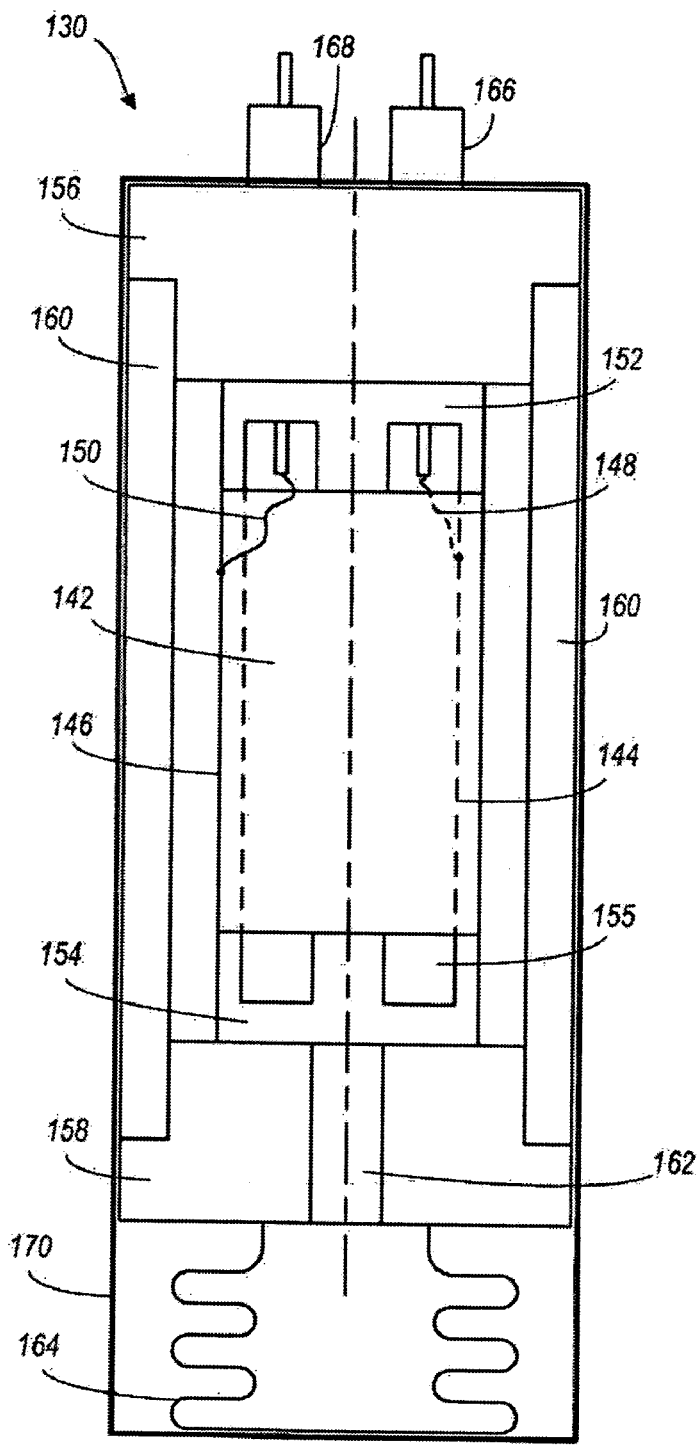
FIG. 4 is a cutaway view of the piezo ceramic cylinder transducer of FIG. 3 packaged as an acoustic transmitter element according to another embodiment of the present invention.

As mentioned above, the multi-pole acoustic transmitter (118) is comprises a plurality of the monopole acoustic transmitter elements (130). Referring next to FIGS. 3–4 each of the monopole acoustic transmitter elements (130) includes a cylindrical transducer, which, according to FIGS. 3–4, is a PZT (lead zirconium titanate) piezo ceramic cylinder (142). The PZT piezo ceramic cylinder (142) is preferably a single piece, with no joints. The unibody arrangement reduces any losses caused by gaps between adjacent pieces of piezo material when a cylinder is constructed of multiple parts. When an input control signal such as a voltage is applied across the PZT piezo ceramic cylinder (142), its diameter expands or contracts via the d31 effect. The pressure pulse generated by the d31 effect is used to measure formation velocity according some embodiments of the present invention, rather than using d33 length-contraction effect typically employed in wellbore logging.

The PZT piezo ceramic cylinder (142) includes an internal surface (144) and an external surface (146). According to some embodiments, both the internal and external surfaces (144, 146) comprise a conductive layer, insulated from one another by the width of the cylinder (142) to create a pair of electrodes. The conductive layers may be added or coated onto the internal and external surfaces (144, 146) by adhesion, electroplating, or other methods. According to some embodiments, the conductive layers are silver. According to other embodiments, the conductive layers comprise nickel. Each of the internal and external surfaces (144, 146) may also include an electrical trace (148, 150, respectively) in electrical communication with the transmitter drive circuit (124, FIG. 1). The electrodes may be used to uniformly polarize the PZT piezo ceramic cylinder (142) in a radial direction. Prior devices have attempted to polarize PZT piezo ceramic cylinders radially by winding the cylinder with wire, but such a polarization method is not capable of uniform polarization as accomplished by the electrodes of the present embodiment. Further, prior PZT piezo ceramic cylinders used as acoustic sources are pre-stressed by winding high strength fiber around an exterior circumference of the cylinder to prevent self-destruction in the event that voltages are supplied to the cylinder at the cylinder's resonant frequency. Such pre-stressing significantly reduces the pressure output of the prior cylinders and therefore reduces efficiency. However, according to the present invention, frequencies of supplied voltages are always lower than a resonant frequency of the PZT piezo ceramic cylinder (142), making pre-stressing unnecessary and providing for a strong, efficient pressure output pulse. According to the embodiments shown, the PZT piezo ceramic cylinder (142) includes a wall thickness between approximately 2 and 8 mm, preferably about 3 mm, and a length that may vary between approximately 4 and 25 cm.

Referring to FIG. 4, each PZT piezo ceramic cylinder (142) is sandwiched between first and second spacers (152, 154). The first and second spacers (152, 154) are made of RADEL®-R (polyphenylsulfone) or other materials. The first and second spacers (152, 154) include holes (155) to avoid closing the ends of the PZT piezo ceramic cylinder (142). The first and second spacers (152, 154) are sandwiched by first and second heads (156, 158, respectively). The first and second heads are preferably comprises of a metal such as stainless steel. The first and second heads (156, 158) are connected to one another by one or more rods (160), which may also be made of stainless steel or other structural materials. The second head (158) may include a hole (162) leading to a pressure compensator, which, according to the embodiment of FIG. 4, is a bellows-type pressure compensator (164). The bellows-type pressure compensator (164) maintains or restores linearity between supplied voltage and output pressure, because without the compensator an increase in voltage supplied to the PZT piezo ceramic cylinder (142) often changes the waveform of the output pressure and breaks linearity.

Further, the electrical trace (148) connected to the interior surface (144) of the PZT piezo ceramic cylinder (142) is also electrically connected to a first electrical feedthru (166). Likewise, the electrical trace (150) connected to the exterior surface (146) of the PZT piezo ceramic cylinder (142) is also electrically connected to a second electrical feedthru (168). Each of the components shown in FIG. 4 is packaged in a canister (170), which is held in the recess (132, FIG. 2A) by first and second mounts (172, 174, FIG. 2A).

The canister (170) is preferably made of a polymer such as RADEL®-R (polyphenylsulfone), although metals or other materials may also be used for the canister. The RADEL®-R (polyphenylsulfone) canister (170) is approximately 1 mm thick and provides superior transmission of pressure pluses generated by the PZT piezo ceramic cylinder (142, FIG. 4) as compared to metal canisters. The canister (170) and therefore the PZT piezo ceramic cylinder (142) are preferably substantially filled with a fluid, such as a silicon oil or other fluid. Therefore, the PZT piezo ceramic cylinder (142) may also be employed as a tube resonator to further enhance output pressure and/or reduce power consumption. Accordingly, in order to take advantage of fluid resonance, the PZT piezo ceramic cylinder (142) length is chosen to correspondingly control the fluid resonant frequency. For example, according to some embodiments, the fluid is silicon oil and the PZT piezo ceramic cylinder (142) is approximately 5 cm, resulting in a fluid resonant frequency of 10 kHz. Similarly, using the same fluid and extending the length of the PZT piezo ceramic cylinder (142) to approximately 10 cm yields a fluid resonant frequency of 5 kHz (without an open-end correction). The resonance frequency of the PZT piezo ceramic cylinder (142) is substantially higher than these fluid resonance frequencies, which allows the PZT piezo ceramic cylinder (142) to operate very efficiently without the need of any pre-stressing. In addition, resonance inside the PZT piezo ceramic cylinders (142) is prevented because the ends of the PZT piezo ceramic cylinders (142) are open.

In operation, the multi-pole acoustic transmitter (118) and the receivers (120, 122) are mounted in respective recesses (e.g. 132, FIG. 2A) in the drill collar (110). Various electronics including the transmitter drive circuit (124) are disposed in atmospheric chambers in the walls of the drill collar (110). Applying a voltage across the PZT piezo ceramic cylinders (142) activates the multi-pole acoustic transmitter (118). The application of a voltage causes the PZT piezo ceramic cylinders (142) to expand by the d31 effect and generate a pressure wave in the fluid contained by the canister (170). The pressure wave travels through any drilling mud in the annulus (126) of the borehole (108) and propagates into the formation (112). At least a portion of the wave propagates uphole according to the direction of the arrows (128) and back toward the borehole (108), where it energizes the receivers (120, 122). The receivers generate electrical output signals based on the timing of waveform detection, and the output signals are telemetered uphole via the measurement-while-drilling tool (114). Formation velocity or slowness is calculated from the output signals, which is generally indicative of formation porosity. The input control signal to the PZT piezo ceramic cylinders (142) may be adjusted to produce monopole, dipole, or quadrupole pressure fields, enabling measurement of slow formation velocities. For example, monopole pressure fields may be produced by applying input signals of the same polarity to all transmitter elements or to a circumferential pattern of transmitter elements. Dipole pressure fields may be produced by applying input signals of opposite polarity to opposing transmitter elements. Quadrupole pressure fields may be produced by applying input signals of one polarity to a set of opposing transmitter elements and applying input signals of the opposite polarity to a second set of opposing transmitter elements.

The preceding description has been presented only to illustrate and describe the invention and some examples of its implementation. It is not intended to be exhaustive or to limit the invention to any precise form disclosed. Many modifications and variations are possible in light of the above teaching. The principles described herein may be used to create any electrical feedthru device with electrical traces traversing the outside, rather than the inside, of the device.

The preferred aspects were chosen and described in order to best explain the principles of the invention and its practical application. The preceding description is intended to enable others skilled in the art to best utilize the invention in various embodiments and aspects and with various modifications as are suited to the particular use contemplated. It is intended that the scope of the invention be defined by the following claims.

What is claimed is:

1. An apparatus for generating acoustic waves in a formation traversed by a wellbore comprising:
   a multi-pole acoustic transmitter, the multi-pole acoustic transmitter comprising at least one monopole acoustic transmitter element housed in a drill collar, the at least one monopole acoustic transmitter element comprising a hollow cylindrical transducer.

2. The apparatus of claim 1, wherein the at least one monopole acoustic transmitter element comprises four monopole acoustic transmitter elements spaced around a circumference of the drill collar at approximately equal intervals and are operable to create a monopole, dipole, or quadrupole pressure field.

3. The apparatus of claim 2, wherein each of the four monopole acoustic transmitter elements comprises a cylindrical transducer and a canister surrounding the transducer.

4. The apparatus of claim 3, wherein the canister and cylindrical transducer are filled with a fluid.

5. The apparatus of claim 4, wherein the canister comprises a polymer material.

6. The apparatus of claim 5, wherein the canister comprises a thickness of approximately 1 mm.

7. The apparatus of claim 4, wherein the cylindrical transducer comprises a PZT piezo-ceramic transducer.

8. The apparatus of claim 7, wherein the PZT piezo-ceramic transducer comprises a tube resonator.

9. The apparatus of claim 8, wherein a voltage is supplied to the PZT piezo-ceramic transducer at a frequency lower than a resonant frequency of the piezo-ceramic transducer.

10. The apparatus of claim 8, wherein a voltage is supplied to the PZT piezo-ceramic transducer at the resonant frequency of the fluid in the piezo-ceramic transducer.

11. The apparatus of claim 8, wherein the cylindrical transducer is sandwiched by spacers having one or more holes therein to avoid closing ends of the cylinder and prevent resonance inside the tube resonator.

12. The apparatus of claim 11, wherein the spacers are sandwiched by first and second heads, and wherein the first and second heads are connected by a rod.

13. The apparatus of claim 12, wherein the canister houses the spacers, the first and second heads, and the rod.

14. The apparatus of claim 7, wherein the PZT piezo-ceramic cylinder is a single piece and is uniformly polarized in a radial direction by applying a voltage across internal and external surfaces of the cylinder with electrodes.

15. The apparatus of claim 7, wherein a diameter of the PZT piezo-ceramic transducer expands or contracts via a d31 effect when a voltage is supplied.

16. The apparatus of claim 2, wherein each monopole acoustic transmitter element comprises a bellows-type pressure compensator to maintain or restore linearity between supplied voltage and output pressure.

17. The apparatus of claim 2, wherein the four monopole acoustic transmitter elements are housed in respective recesses in the drill collar and covered by a shield, the shield comprising a hole for allowing pressure pulses generated by each monopole acoustic transmitter element to travel therethrough.

18. The apparatus of claim 17, wherein each of the respective recesses comprises an associated shield, the associated shield comprising a plurality of holes for allowing pressure pulses generated by each monopole acoustic transmitter to travel trough.

19. The apparatus of claim 17, wherein the recesses comprise a depth of approximately 3.0 to 5.0 cm, a width of approximately 3.0 to 5.0 cm, and a length of approximately 25 to 35 cm.

20. The apparatus of claim 18, wherein the four monopole transmitter elements each comprise a PZT piezo ceramic cylinder having a length ranging between approximately 5 and 10 cm and a wall thickness ranging from approximately 3 to 6 mm.

21. The apparatus of claim 18, wherein the drill collar comprises a pipe having an outer diameter of approximately 17.5 cm and an inner diameter of approximately 6.1 cm.

22. An apparatus for generating an acoustic signal in response to input control signals comprising:
   a plurality of hollow cylindrical piezo ceramic elements spaced about a common circumference to form a multi-pole acoustic transmitter;
   a plurality of polymer canisters, each of the plurality of polymer canisters associated with and housing one of the plurality of cylindrical piezo ceramic elements;
   wherein each of the plurality of cylindrical piezo ceramic elements is uniformly polarized in a radial direction.

23. The apparatus of claim 22, wherein each of the plurality of cylindrical piezo ceramic elements comprises an internal and an external surface, wherein each of the internal and external surfaces includes a conductive layer, the conductive layers comprising electrodes.

24. The apparatus of claim 23, wherein die electrodes uniformly polarize the cylindrical piezo ceramic elements radially.

25. The apparatus of claim 23, wherein the conductive layers comprise silver.

26. The apparatus of claim 23, wherein the conductive layers comprise nickel.

27. The apparatus of claim 22, wherein none of the plurality of cylindrical piezo ceramic elements is prestressed.

28. The apparatus of claim 27, wherein none of the plurality of cylindrical piezo ceramic elements is wound under tension with high strength fibers.

29. The apparatus of claim 22, wherein each of the plurality of canisters is filled with a fluid, and wherein the plurality of cylindrical piezo ceramic elements and canisters comprises fluid resonance tubes.

30. The apparatus of claim 29, wherein each of the plurality of cylindrical piezo ceramic elements comprises first and second ends, wherein the first and second ends are both open and spaced from the associated canister.

31. The apparatus of claim 29, wherein the input control signal comprises a frequency lower than a resonant frequency of the plurality of cylindrical piezo ceramic elements.

32. The apparatus of claim 31, wherein the input control signal comprises a frequency at a resonant frequency of the fluid inside the plurality of cylindrical piezo ceramic elements.

33. The apparatus of claim 32, wherein the resonant frequency of the fluid inside the plurality of cylindrical piezo ceramic elements is controlled by geometry of the plurality of the cylindrical piezo ceramic elements to be below the resonant frequency of the cylindrical piezo ceramic elements.

34. The apparatus of claim 22, wherein one or more of the plurality of cylindrical piezo ceramic elements comprises a bellows-type pressure compensator.

35. The apparatus of claim 22, wherein the plurality of polymer canister comprises polyphenylsulfone.

36. The apparatus of claim 22, wherein the plurality of cylindrical piezo ceramic elements and associated canisters comprises four cylindrical piezo ceramic elements and canisters equally spaced about the circumference within respective recesses of a drill collar.

37. The apparatus of claim 36, wherein each of the four cylindrical piezo ceramic elements comprises a monopole source, and wherein the combination of the four cylindrical piezo ceramic elements comprises a monopole, dipole, or quadrupole source depending on the input control signals.

38. An acoustic transmitter apparatus comprising:
a drill collar for coupling to a drill string, the drill collar comprising a recess;
a hollow cylindrical piezo ceramic element enclosed by a canister disposed in the recess;
a fluid contained by the canister;
wherein the cylindrical piezo ceramic element also comprises a tube resonator;
wherein a length of the cylindrical piezo ceramic element and the fluid are chosen such that a fluid resonance frequency is lower than a resonance frequency of the cylindrical piezo ceramic element.

39. The apparatus of claim 38, further comprising
four recesses in the drill collar equally spaced about a circumference of the drill collar; and
four cylindrical piezo ceramic elements enclosed by canisters disposed in the four recesses.

40. The apparatus of claim 39, wherein each of the four cylindrical piezo ceramic elements comprises a monopole source, but used in combination the four cylindrical piezo ceramic elements comprises a monopole, dipole, or quadrupole transmitter.

41. The apparatus of claim 38, wherein the cylindrical piezo ceramic element is uniformly polarized in a radial direction.

42. The apparatus of claim 38, wherein the cylindrical piezo ceramic element further comprises a bellows-type pressure compensator, and wherein the canister comprises a polymer material.

43. A method of logging a wellbore while drilling comprising:
providing an acoustic transmitter comprising a hollow cylindrical transducer, and a plurality of receivers on a drill string, the acoustic transmitter arranged to provide a monopole, dipole, or quadrupole source from a plurality of monopole source elements;
activating the acoustic transmitter; and
receiving and recording waveform data.

44. The method of claim 43, further comprising enhancing output pressure front the acoustic transmitter by employing the acoustic transmitter as a resonance tube and applying a signal to the acoustic transmitter at a fluid resonance frequency of the resonance tube.

45. The method of claim 43, further comprising using waves generated by a d31 effect from the transducer and not waves generated by a d33 effect.

46. The method of claim 43, wherein providing an acoustic transmitter further comprises providing a hollow cylindrical piezo ceramic element and polarizing the element uniformly in a radial direction.

47. The method of claim 46, wherein the polarizing further comprises coating an inner and an outer surface of the element with a conductor to create two electrodes, and applying a voltage thereacross.

* * * * *